(12) United States Patent
Kurz et al.

(10) Patent No.: US 12,195,086 B2
(45) Date of Patent: Jan. 14, 2025

(54) METHOD FOR ADJUSTING A TRACK OF AT LEAST ONE VEHICLE WHEEL

(71) Applicant: Robert Bosch GmbH, Stuttgart (DE)

(72) Inventors: Thomas Kurz, Roemerberg (DE); Tobias Ritz, Leonberg (DE); Christian Riese, Stuttgart (DE); Matthias Ehrmann, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/571,440

(22) PCT Filed: Mar. 16, 2022

(86) PCT No.: PCT/EP2022/056800
§ 371 (c)(1),
(2) Date: Dec. 18, 2023

(87) PCT Pub. No.: WO2023/274588
PCT Pub. Date: Jan. 5, 2023

(65) Prior Publication Data
US 2024/0286679 A1 Aug. 29, 2024

(30) Foreign Application Priority Data
Jun. 28, 2021 (DE) ...................... 10 2021 206 684.4

(51) Int. Cl.
*B62D 17/00* (2006.01)
*B62D 5/00* (2006.01)
*B62D 5/04* (2006.01)

(52) U.S. Cl.
CPC ............. *B62D 17/00* (2013.01); *B62D 5/001* (2013.01); *B62D 5/0421* (2013.01); *B60G 2200/4622* (2013.01)

(58) Field of Classification Search
CPC .......... B62D 17/00; B62D 5/001; B62D 5/04; B62D 5/0418; B62D 5/0421;
(Continued)

(56) References Cited

U.S. PATENT DOCUMENTS

| 5,002,142 A | * | 3/1991 | Klosterhaus | ......... | B62D 5/0418 180/444 |
| 6,554,094 B1 | | 4/2003 | Bell et al. | | |
| 2016/0144890 A1 | * | 5/2016 | Kim | ....... | B62D 6/002 701/41 |

FOREIGN PATENT DOCUMENTS

CN 112638747 A * 4/2021 ............. B62D 5/001
DE 10 2006 043 069 A1 3/2008
(Continued)

OTHER PUBLICATIONS

International Search Report corresponding to PCT Application No. PCT/EP2022/056800, mailed Jul. 11, 2022 (German and English language document) (5 pages).

*Primary Examiner* — Keith J Frisby
(74) *Attorney, Agent, or Firm* — Maginot, Moore & Beck LLP (57) ABSTRACT

A method for adjusting a track of a vehicle wheel using a wheel steering-angle adjusting device during operation of the vehicle, the wheel steering-angle adjusting device including a steering mechanism with a movably mounted steering adjusting element for changing a wheel steering angle of the vehicle wheel and a steering actuator for changing a position of the steering adjusting element. The steering adjusting element has, for coupling to the steering actuator, a coupling portion which defines a maximum adjusting displacement which is greater than an adjusting displacement required for changing the wheel steering angle of the vehicle wheel. An operating variable of the steering actuator is determined and compared with a reference vari-
(Continued)

able. When the operating variable differs from the reference variable, for the adjustment of the track of the vehicle wheel, an operating position and/or resting position of the steering adjusting element is varied using the steering actuator.

14 Claims, 3 Drawing Sheets

(58) Field of Classification Search
CPC ...... B62D 5/0424; B62D 5/0427; B62D 5/00; B60G 2800/963; B60G 2200/4622; B60G 2200/462
USPC ...... 280/5.522, 5.52, 86.758, 86.75; 180/402
See application file for complete search history.

(56) References Cited

FOREIGN PATENT DOCUMENTS

| | | | |
|---|---|---|---|
| DE | 10 2006 059 075 A1 | 6/2008 | |
| DE | 10 2016 212 677 A1 | 1/2018 | |
| DE | 10 2017 221 379 A1 | 5/2019 | |
| JP | 2014210484 A * | 11/2014 | ........... B60K 17/356 |
| WO | WO-2019189103 A1 * | 10/2019 | ........... B60B 35/003 |

* cited by examiner

METHOD FOR ADJUSTING A TRACK OF AT LEAST ONE VEHICLE WHEEL

This application is a 35 U.S.C. § 371 National Stage Application of PCT/EP2022/056800, filed on Mar. 16, 2022, which claims the benefit of priority to Serial No. DE 10 2021 206 684.4, filed on Jun. 28, 2021 in Germany, the disclosures of which are incorporated herein by reference in their entirety.

BACKGROUND

The disclosure relates to a method for adjusting a track of at least one vehicle wheel of a vehicle by means of a wheel steering-angle adjusting device. The disclosure also relates to a control unit with a computing unit for carrying out such a method and to a vehicle with such a wheel steering-angle adjusting device and such a control unit.

Vehicles with conventional steering systems in which a steering handle, e.g., in the form of a steering wheel, is mechanically connected to a wheel steering angle controller in the form of a steering gear via a steering column are known from the prior art. Also known are vehicles with steer-by-wire steering systems, which do not require a direct mechanical connection between a steering handle and steered vehicle wheels, and in which a steering command is transmitted exclusively electrically. For changing a wheel steering angle of a vehicle wheel, the steer-by-wire steering systems include a wheel steering angle controller electrically connected to the steering handle in the form of a central adjuster or multiple wheel steering angle controllers electrically connected to the steering handle in the form of individual wheel adjusters.

For setting and/or adjusting the track of such vehicles, an additional, external axle measuring system is normally used, which must be elaborately attached to the vehicle on a lifting platform, and by means of which a length of the tie rods can be adjusted.

In addition, a method for setting a toe-in angle of a vehicle wheel by means of a wheel steering-angle adjusting device is known from DE 10 2017 221 379 A1. For this purpose, a correction torque can be generated during vehicle operation and applied to the vehicle wheels. Preferably, the toe-in angle is adjusted by means of the wheel steering-angle adjusting device such that it is as small as possible during straight-line driving operation of the vehicle. However, by setting the toe-in angle in this manner, only a temporary adjustment of the vehicle track which is specifically adapted to a particular driving situation is achieved. This does not allow for permanent track adjustment by adjusting an adjusting displacement used to change the wheel steering angle of the vehicle wheel and varying an operating position and/or resting position of a steering adjusting element.

The object of the disclosure is therefore in particular to provide a method for adjusting a track of a vehicle wheel with improved properties with respect to efficiency. The object is achieved by the features of claims 1, 12 and 13, while advantageous designs and further developments of the disclosure can be found in the dependent claims.

SUMMARY

A method for the, in particular automatic and/or automated, adjustment of a track, preferably a toe-in angle, of at least one vehicle wheel of a vehicle by means of a wheel steering-angle adjusting device, in particular during the operation, advantageously during driving operation, of the vehicle is proposed, wherein the wheel steering-angle adjusting device comprises a steering mechanism with a movably mounted steering adjusting element for changing a wheel steering angle of the vehicle wheel and a steering actuator for changing a position of the steering adjusting element, wherein the steering adjusting element has, for coupling with the steering actuator, a coupling portion which defines a maximum adjusting displacement which is greater than an adjusting displacement required for changing the wheel steering angle of the vehicle wheel, wherein at least one operating variable of the steering actuator is determined and compared with at least one reference variable, and wherein, if the operating variable differs from the at least one reference variable, in particular a deviation above a threshold value, for the adjustment of the track of the vehicle wheel, an adjusting displacement of the coupling portion that is used for changing the steering angle of the vehicle wheel is adapted in that an operating position and/or resting position of the steering adjusting element is varied by means of the steering actuator. The terms "track" or "toe-in angle" in this context advantageously refer to a static track angle, in particular independently of a toe-in or toe-out. In particular, in a first operating state, in particular temporally before the track of the vehicle wheel is adjusted, a first sub-portion of the coupling portion and in a second operating state, in particular after the track of the vehicle wheel is adjusted, a second sub-portion of the coupling portion which at least partially deviates from the first sub-portion and/or a different second sub-portion of the coupling portion is used to change the wheel steering angle of the vehicle wheel. Furthermore, the track of the vehicle wheel in this context is adapted to a vehicle design, and not to a specific driving situation. With this design, an efficiency, in particular a maintenance efficiency, power efficiency, adjustment efficiency, steering efficiency, energy efficiency and/or cost efficiency can be optimized. In particular, operational changes to the track and/or deviations of the track from an initial factory setting can be balanced during operation of the vehicle, thereby advantageously achieving a consistently factory-set track. Moreover, in particular, an advantageously flexible wheel steering-angle adjusting device can be provided, wherein a need-based adjustment of the track can be achieved. In addition, maintenance costs can be advantageously reduced, and the service life of the vehicle can be increased.

A "wheel steering-angle adjusting device" is to be understood to refer to at least one component, in particular a sub-assembly, of a wheel steering angle controller, in particular a steering system, and preferably a vehicle. The wheel steering angle controller has an active connection with at least one vehicle wheel, and is provided for this purpose in particular for transmitting a steering input to the vehicle wheel by changing a wheel steering angle of at least one vehicle wheel, thereby advantageously controlling an alignment of the vehicle wheel and/or influencing a direction of travel of the vehicle. In this case, the wheel steering angle controller can in particular be set up as a central controller, and can therein be assigned to at least two, in particular steerable, vehicle wheels, preferably formed as front wheels. However, the wheel steering angle controller is preferably designed as a single-wheel controller and assigned to exactly one, in particular steerable, vehicle wheel that is preferably formed as a front wheel. Moreover, in particular, the steering system can be designed as a conventional steering system, in particular as an electric power steering system, and can comprise a mechanical through handle. The steering system is preferably designed as a steer-by-wire steering system, in which a steering command, in particular from a driver, is advantageously transmitted to the vehicle wheels purely electrically.

Further, a "steering mechanism" is to be understood in particular to refer to a unit which is provided as a mechanical connection of at least one vehicle wheel to a vehicle structure of the vehicle. In addition, the steering mechanism is particularly provided for mechanically transferring a steering specification to the at least one vehicle wheel. For this purpose, the steering mechanism comprises the steering adjusting element, which in particular is movably supported in the axial direction. The steering adjusting element is advantageously designed as a shaft, a threaded spindle or a toothed rack, and comprises a coupling portion, for example in the form of a threaded portion or a toothed portion, which provides an adjusting displacement for changing the wheel steering angle of the vehicle wheel. In the present case, a maximum adjusting displacement of the coupling portion is greater than a travel required during vehicle operation to change the wheel steering angle of the vehicle wheel, such that only a sub-portion of the coupling portion is used to change the wheel steering angle of the vehicle wheel in a normal operating state and/or a normal driving condition. Moreover, the steering mechanism can have further components and/or assemblies, for example a steering mechanism housing in which the steering adjusting element is arranged, and/or at least one wheel connection element, in particular designed as a hinge head or tie rod. An "operating position and/or resting position of the steering adjusting element" is to be understood in particular as a position of the steering adjusting element in which the steering adjusting element is located after a system and/or operating start of the vehicle, after an initial initialization, and/or in a parked state of the vehicle. Furthermore, a "steering actuator" is intended to be an actuator unit in operative communication with the steering adjusting element, in particular the coupling portion, and in particular at least partially electrically and/or electronically designed, which is provided in at least one operating state for movement, in particular active movement, and/or adjustment of the steering adjusting element. Herein the steering actuator is preferably provided to change a rotational position and/or an axial position of the steering adjusting element. In particular, the steering actuator is provided for this purpose at least to transmit an actuating torque to the steering adjusting element and thereby to enable adjustment of the track of the vehicle wheel. In addition, the steering actuator is advantageously provided for this purpose to transmit a steering torque to the steering adjusting element and thereby affect a direction of travel of the vehicle. Herein the steering actuator is preferably provided for this purpose to provide a steering torque to support a manual torque applied by the driver to the steering handle, and/or a steering torque for automatic and/or autonomous control of a direction of travel of the vehicle. For this purpose the steering actuator can comprise at least one electric motor and preferably at least one coupling gear box for connecting the electric motor to the steering adjusting element, in particular the coupling portion.

Furthermore, the vehicle comprises at least one computing unit that is provided for this purpose for performing the method of adjusting the track of the vehicle wheel, in particular by controlling the wheel steering-angle adjusting device. The term "computing unit" is in particular intended to mean an electrical and/or electronic unit which has an information input, an information processor, and an information output. Furthermore, the computing unit advantageously has at least one processor, at least one operating memory, at least one input and/or output means, at least one operating program, at least one control routine, at least one calculation routine, at least one evaluation routine and/or at least one adjustment routine. Herein the computing unit is provided for this purpose in particular to drive the steering actuator to change the wheel steering angle of the vehicle wheel. In addition, the computing unit is provided for this purpose to determine an operating variable of the steering actuator, preferably in operation, particularly advantageously in driving operation, of the vehicle, and match it with at least one reference variable to determine a deviation between the operating variable and the at least one reference variable. Further, in the present case, the computing unit is provided for this purpose for adjusting an adjusting displacement of the coupling portion that is used to change the wheel steering angle of the vehicle wheel in the event of a deviation of the operating variable from the at least one reference variable for adjusting the track of the vehicle wheel. In this regard, the computing unit is provided for this purpose to control the steering actuator, such that an operating position and/or resting position of the steering adjusting element is varied. Preferably, the computing unit is furthermore integrated into a control unit of the vehicle and/or a control unit of the steering system, in particular in the form of a steering control unit. The term "provided" is in particular intended to mean specifically programmed, designed, and/or equipped. The phrase "an object being provided for a specific function" is particular intended to mean that the object fulfills and/or performs this specific function in at least one application and/or operating state.

Preferably, the coupling portion comprises an adjusting range and at least one readjusting range adjacent to the adjusting range, wherein the adjusting range provides a nominally required adjusting displacement for changing the wheel steering angle of the vehicle wheel, and the readjusting range provides an additional adjusting displacement as a lead for setting and/or adjusting the track of the vehicle wheel. Advantageously, a ratio between a longitudinal extension and/or an axial length of the readjusting range and a longitudinal extension and/or an axial length of the adjusting range thereby lies between 0.01 and 0.05. In this context, the adjusting range in particular defines a nominally required actuator stroke, which, for example, can lie within a range of between +/−75 mm. In particular, the readjusting range defines a low additional actuator stroke, which can range from +/−0.75 mm to +/−3.75 mm, for example. In particular, the coupling portion can also comprise two readjusting ranges, wherein a first readjusting range is arranged on a side of the adjusting range facing away from the vehicle wheel, and a second readjusting range is arranged on a side of the adjusting range facing towards the vehicle wheel. In the present case, the at least one readjusting range is used to adjust a utilized travel path. In particular, in a first operating state, in particular temporally before the track of the vehicle wheel is adjusted, a first adjusting displacement is determined from the adjusting range or a part of the adjusting range and a part of the at least one readjusting range, such that a first partial portion of the coupling portion is used to change the wheel steering angle of the vehicle wheel. In addition, in particular in a second operating state, in particular temporally after the track of the vehicle wheel is adjusted, a second adjusting displacement which at least partially deviates from and/or differs from the first adjusting displacement is determined from the adjusting range or a portion of the adjusting range and a portion of the at least one readjusting range, so that a second partial range of the coupling section is used to change the wheel steering angle of the vehicle wheel in the second operating state. This can in particular achieve a particularly flexible adjustment of the track.

Moreover, it is proposed that the operating variable be determined during straight-line driving operation of the vehicle. Hereby the operating variable can advantageously be determined easily. In addition, an advantageously simple matching of the operating variable with the reference variable can be achieved.

For example, the operating variable could be determined during manual driving operation. However, a particularly accurate determination of the operating variable can be achieved if the operating variable is determined during autonomous and/or automated driving operation. Particularly preferably, the operating variable is determined in this context during autonomous and/or automated driving operation and during straight-line driving operation of the vehicle, for example during highway driving operation using a highway assist function, whereby particularly exact straight-line driving operation of the vehicle can be achieved by using a corresponding target trajectory.

Furthermore, the operating variable could, for example, consist of a voltage value and/or current value of the steering actuator. However, it is preferably proposed that a motor torque of the steering actuator be used as the operating variable, which can thereby further simplify matching with the reference variable. Particularly advantageously, the motor torque of the steering actuator, which is required to set and/or hold the, in particular axial, position of the steering actuator during straight-line driving operation of the vehicle, is used as the operating variable.

It is furthermore proposed that a pre-applied factory setting, in particular for the operating variable, be used as the reference variable; preferably during straight-line driving operation of the vehicle. In this case, the reference variable can in particular be determined by means of test measurements and/or specific algorithms, and can preferably originate from the vehicle itself and/or further vehicles that are advantageously structured identically to the vehicle. Preferably, the reference variable can thereby be stored in the operating memory of the computing unit and/or a further operating memory of the vehicle. This makes it possible to achieve a particularly high level of operational reliability.

Alternatively or additionally, it is proposed that a further operating variable which is equivalent to the operating variable of a further steering actuator, which is, in particular, assigned to a further vehicle wheel opposite the vehicle wheel, be used as the reference variable. In particular, the vehicle and/or the steering system in this case comprises at least two wheel steering angle actuators that are designed as individual wheel actuators, wherein one of the steering actuators is assigned to each of the wheel steering angle actuators, and each of the wheel steering angle actuators are assigned to a vehicle wheel, which is advantageously formed as a front wheel. Furthermore, the reference variable or the further operating variable is advantageously determined during straight-line driving operation of the vehicle, preferably during autonomous and/or automated driving operation. Particularly preferably, the operating variable and the reference variable or further operating variable are thereby determined in the same driving operation state. Moreover, the reference variable or the further operating variable advantageously corresponds to a motor torque of the further steering actuator. In particular, an advantageous adjustment between the vehicle wheels can be achieved as a result, wherein temporal changes, such as signs of aging and/or signs of wear, can be considered in particular.

In addition, it is alternatively or additionally proposed that a drive torque, in particular of the at least one vehicle wheel, which is required for straight-line driving operation be used as the reference variable. Using the drive torque, the track of the vehicle wheel can also be advantageously monitored for changes.

A particularly efficient adjustment of the track and/or a particularly high operational reliability can be achieved in particular if the operating variable is matched with at least two reference variables, and the utilized adjusting displacement is only adjusted if the operating variable deviates from both reference variables. In particular, if the operating variable deviates from the first reference variable, in particular a deviation above a threshold value, and a deviation of the operating variable from the second reference variable, in particular a deviation above a further threshold value, an adjusting displacement of the coupling section that is used to change the wheel steering angle of the vehicle wheel is adapted to readjust the track of the vehicle wheel by varying an operating position and/or resting position of the steering actuator by means of the steering adjusting element. In principle, the operating variable can also be matched with at least three reference variables, and the utilized adjusting displacement can only be adjusted if the operating variable deviates from all three reference variables. In this context, the reference variables can in particular correspond to a factory setting applied in advance, a further operating variable that is equivalent to the operating variable of a further steering actuator, which is in particular associated with a further vehicle wheel opposite the vehicle wheel, and/or a driving torque, which is preferably required for straight-line driving operation.

It is further proposed that, in at least one operating state in which the maximum adjusting displacement is insufficient to adjust the vehicle wheel, a message be generated and, in particular, indicated to an occupant of the vehicle and/or an owner of the vehicle. For example, the message can include a request to visit a workshop. In particular, an advantageous message and/or warning function can be realized hereby.

The method for adjusting the track of the vehicle wheel and the vehicle hereby are not intended to be limited to the application and embodiment described above. In particular, the method for adjusting the track of the vehicle wheel and the vehicle can have a number of individual elements, components, and units that differ from a number specified herein to perform a function described herein.

BRIEF DESCRIPTION OF THE DRAWINGS

Further advantages will become apparent from the following description of the drawings. The drawings illustrate an embodiment example of the disclosure. Here.

DETAILED DESCRIPTION

Figure 1A:
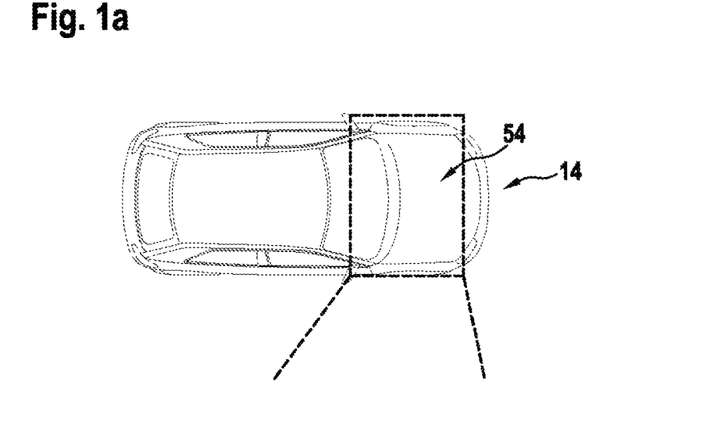
FIG. 1a a vehicle with an exemplary steering system.
Figure 1B:
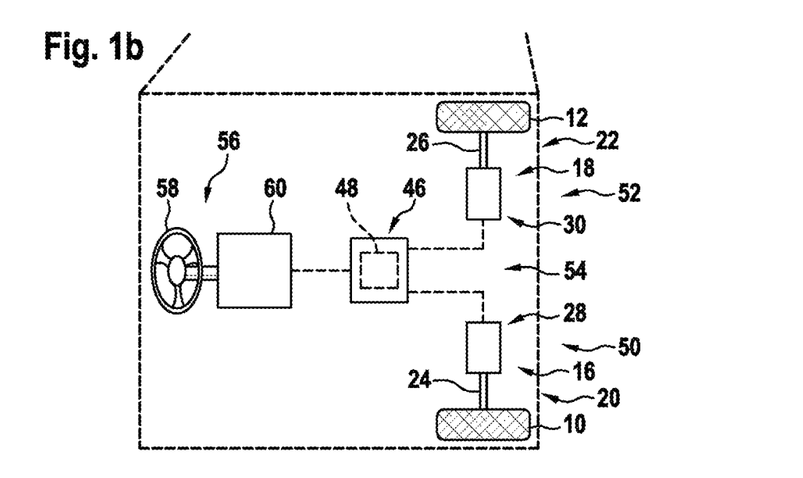
FIG. 1b the vehicle of FIG. 1a showing the with an exemplary steering system in the form of a steer-by-wire steering system, which comprises two wheel steering angle controllers, each with a wheel steering-angle adjusting device, in a simplified illustration, FIG. 2 one of the wheel steering-angle adjusting devices with a steering mechanism and a steering actuator in a detailed representation, and FIG. 3 an exemplary signal flow diagram for adjusting a track of at least one vehicle wheel of the vehicle by means of the wheel steering-angle adjusting device of FIG. 2.

FIGS. 1a and 1b show an exemplary vehicle 14 designed as a passenger vehicle with multiple vehicle wheels 10, 12 and with a steering system 54 in a simplified representation. The steering system 54 has an operative connection with the vehicle wheels 10, 12 and is provided for influencing a direction of travel of the vehicle 14. Furthermore, the steering system 54 in the present case is designed as a steer-by-wire steering system in which a steering command is electrically transmitted to the vehicle wheels 10, 12 in at least one operating state. In principle, however, a steering system could also be designed as a conventional steering system, in particular as an electric power steering system.

The steering system 54 has a steering input unit 56 that is known per se, which comprises a steering handle 58, for example in the form of a steering wheel, and a feedback actuator 60 coupled, in particular mechanically, with the steering handle 58. In the present case, the feedback actuator 60 is provided at least for generating a steering resistance and/or a self-aligning torque on the steering handle 58. A steering handle could alternatively also be designed as a joystick, a steering lever, and/or as a steering ball or the like. A feedback actuator could in principle also be omitted. It is furthermore also conceivable to completely omit a steering input unit.

The steering system 54 furthermore has at least one wheel steering angle controller 50, 52. In the present case, the steering system 54 comprises, by way of example, two wheel steering angle controllers 50, 52 in the form of individual wheel controllers and consequently, in particular, individual wheel steering. The wheel steering angle controllers 50, 52 are at least substantially structurally identical. The wheel steering angle controllers 50, 52 are formed separately from one another and, in the present case, are free of a mechanical connection. The wheel steering angle controllers 50, 52 can be controlled independently of one another. The wheel steering angle controllers 50, 52 are moreover purely electrically connected to the steering input unit 56, and consequently the steering handle 58. Each of the wheel steering angle controllers 50, 52 has an operative connection to exactly one of the vehicle wheels 10, 12, in particular a front wheel. The wheel steering angle controllers 50, 52 are provided for this purpose to change a respective wheel steering angle of the corresponding vehicle wheel 10, 12 as a function of a steering input. For this purpose, each of the wheel steering angle controllers 50, 52 comprises a wheel steering-angle adjusting device 16, 18. Each of the wheel steering-angle adjusting devices 16, 18 comprises a steering mechanism 20, 22 with a steering adjusting element 24, 26, and a steering actuator 28, 30 interacting with the steering adjusting element 24, 26. A detailed construction of the wheel steering-angle adjusting devices 16, 18 is described below with reference to FIG. 2. Basically, a steering system could naturally also comprise a wheel steering angle controller that is designed as a central controller. A steering system can furthermore also comprise at least four wheel steering angle controllers designed as single-wheel controllers. A steering system could in principle also comprise a combination of a wheel steering angle controller formed as a single-wheel controller and a wheel steering angle controller formed as a central controller. Moreover, at least one wheel steering angle controller could, in particular, also be assigned to a vehicle wheel that is formed as a rear wheel.

The vehicle 14 furthermore has a control unit 46. In the present case, the control unit 46 is designed as a steering control unit, and is therefore part of the steering system 54. The control unit 46 has an electrical connection to the wheel steering angle adjusters 50, 52. The control unit 46 furthermore has an electrical connection to the steering input unit 56. In the present embodiment, the control unit 46 is provided at least for controlling an operation of the steering system 54.

The control unit 46 comprises a computing unit 48 for this purpose. The computing unit 48 comprises at least one processor (not shown), for example in the form of a microprocessor, and at least one operating memory (not shown). In addition, the computing unit 48 comprises at least one operating program that is stored in the operational memory, with at least one calculation routine, at least one detection routine, at least one control routine, at least one evaluation routine 74, 78, 80, at least one reset routine 82 and at least one message routine 84 (see also FIG. 3). A control unit could, in principle, also differ from a steering control unit and be formed as a single, central vehicle control unit with a central computing unit, for example. In addition, it is conceivable to provide separate control units for each wheel steering angle adjuster and for the steering input unit and connect them such that they communicate with each other.

Moreover, the vehicle 14 can comprise further non-illustrated components and/or assemblies, such as internal vehicle sensors for sensing at least one operating variable of the wheel steering angle controllers 50, 52, in particular the steering actuators 28, 30, an on-board computer that is known per se, and/or a navigation device that is known per se.

In the following text, with reference to FIG. 2, a wheel steering angle controller 50 of the wheel steering angle controllers 50, 52 is described in further detail in conjunction with a vehicle wheel 10 of the vehicle wheels 10, 12 that are assigned to the wheel steering angle controller 50, wherein the following description can also be applied to the further wheel steering angle controller 52 and the further vehicle wheel 12, in particular due to the at least substantially identical construction of the wheel steering angle controllers 50, 52.

Figure 2:
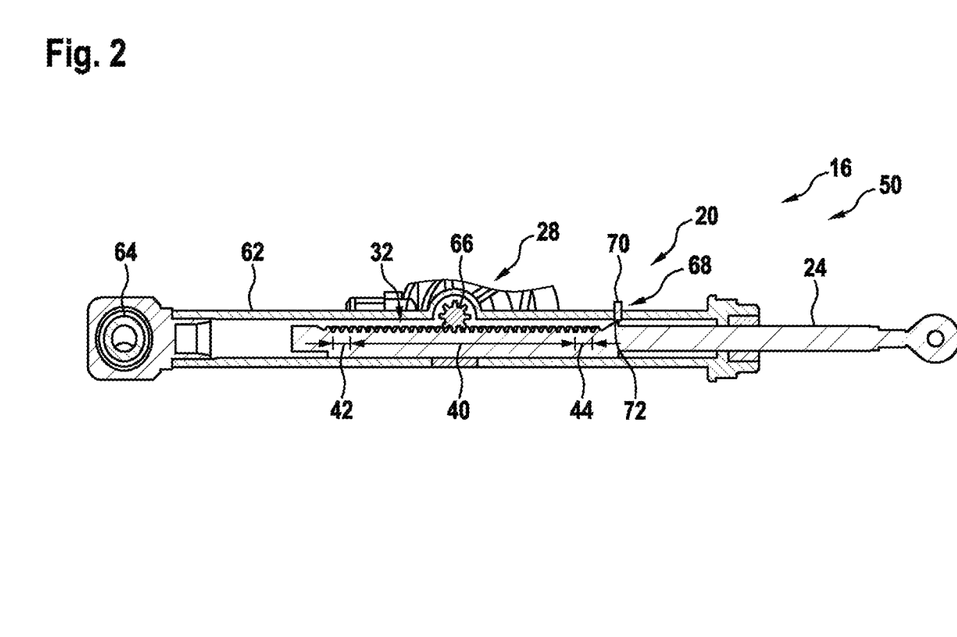

The wheel steering angle controller 50, as previously described, comprises the wheel steering-angle adjusting device 16 with the steering mechanism 20 and the steering actuator 28 (shown only partly in FIG. 2).

The steering mechanism 20 is elongated, wherein an extension direction of the steering mechanism 20 defines an axial direction. The steering mechanism 20 is provided for mechanically connecting the vehicle wheel 10 to a vehicle structure (not shown) of the vehicle 14. For this purpose the steering mechanism 20 comprises a steering mechanism housing 62 with a bearing unit 64, for example in the form of a rubber bearing. Moreover, the steering mechanism 20 is provided for transmitting a steering command to the vehicle wheel 10, and consequently, for changing the wheel steering angle of the vehicle wheel 10. For this purpose the steering mechanism 20 comprises the steering adjusting element 24, which is arranged in the steering mechanism housing 62 in a manner enabling it to move in the axial direction, and is designed in particular as a toothed rack in the present case.

The steering adjusting element 24 has a coupling portion 32 which provides an adjusting displacement for changing the wheel steering angle of the vehicle wheel 10. The coupling portion 32 is designed as a toothed portion. In principle, however, a coupling portion could also be formed as a threaded portion. In the present case, a maximum adjusting displacement of the coupling portion 32 is greater than a total adjusting displacement that is required in the operation of the vehicle 14 to change the wheel steering angle of the vehicle wheel 10. The coupling portion 32 thereby comprises an adjusting range 40 and two readjusting ranges 42, 44 adjacently to the adjusting range 40, wherein a first readjusting range 42 is arranged on a side of the adjusting range 40 facing away from the vehicle wheel 10, and a second readjusting range 44 is arranged on a side of the adjusting range 40 facing the vehicle wheel 10. The adjusting range 40 provides a nominally required adjusting displacement for changing the wheel steering angle of the vehicle wheel 10, while the adjusting ranges 42, 44 provide an additional adjusting displacement as a reserve for setting and/or adjusting the track of the vehicle wheel 10. A ratio between a longitudinal extension and/or an axial length of the readjusting ranges 42, 44 and a longitudinal extension and/or an axial length of the adjusting range 40 lies between 0.01 and 0.05. Accordingly, the adjusting range 40 defines a nominally required actuator stroke, which can be within the range of, for example, +/−75 mm, while the readjusting ranges 42, 44 define a small additional actuator stroke, which can be within the range of, for example, +/−0.75 mm to +/−3.75 mm. In a normal operating state and/or in a normal driving operation state, a required adjusting displacement for changing the wheel steering angle of the vehicle wheel 10 is determined from the adjusting range 40 or from a portion of the adjusting range 40 and a portion of the first readjusting range 42 or the second readjusting range 44, such that only a sub-portion of the coupling portion 32 is used to change the wheel steering angle of the vehicle wheel 10 in the normal operating state and/or in a normal driving operation state.

The steering actuator 28 is coupled to the steering adjusting element 24, in particular the coupling portion 32. The steering actuator 28 is at least partially electrically and/or electronically formed, and is provided for active movement and/or adjustment of the steering adjusting element 24, and consequently, for changing a position of the steering adjusting element 24. For this purpose the steering actuator 28 comprises at least one electric motor (not shown) and preferably at least one coupling gear box 66 for connecting the electric motor to the steering adjusting element 24, and in particular the coupling portion 32. In the present case, the steering actuator 28 is provided in interaction with the coupling portion 32 to change the wheel steering angle of the vehicle wheel 10. Of course, it is also conceivable to omit an additional coupling gear box, and directly couple an electric motor to a steering adjusting element.

In certain situations, there can be undesired displacement of the track of the vehicle wheel 10 and/or the further vehicle wheel 12. Such displacement can occur, for example, gradually through wear of rubber bearings of the steering system 54 and/or through minor accident damage; for example, when steering against a curb. However, if the track deviates from an initial factory setting and/or factory specification, this can result in increased wear and/or damage to the vehicle wheels 10, 12 or the steering system 54.

For this reason, a method for adjusting the track of at least one vehicle wheel 10, 12 of the vehicle 14 during operation of the vehicle 14 is described below. In the present case, the computing unit 48 in particular is provided to carry out the method by controlling the corresponding wheel steering-angle adjusting device 16, 18, and in particular, has a computer program with corresponding program code means for this purpose.

The method described below relates, by way of example, to the wheel steering angle controller 50 or the wheel steering-angle adjusting device 16, as well as the vehicle wheel 10. However, the following description can also be generally applied to the further wheel steering angle controller 52 or the further wheel steering-angle adjusting device 18, as well as the further vehicle wheel 12.

In the present case, to adjust the vehicle wheel 10 while driving the vehicle 14, at least one operating variable 34 of the steering actuator 28 that is associated with the vehicle wheel 10 in particular is determined and matched with at least one reference variable 36, 38. In the present case, a motor torque of the steering actuator 28 is determined and used as the operating variable 34. The operating variable 34 can be sensed, for example, by the internal vehicle sensory technology or retrieved from the control unit 46. A previously applied factory setting for the operating variable 34 and/or a further operating variable that is equivalent to the operating variable 34 of the further steering actuator 30 that is, in particular, assigned to the further vehicle wheel 12, i.e. a motor torque of the further steering actuator 30 in the present case, can be used as the reference variable 36, 38. Alternatively or additionally, however, a drive torque of a vehicle wheel can also be used as the reference variable.

In the event of a deviation of the operating variable 34 from the at least one reference variable 36, 38, an adjusting displacement of the coupling section 32 that is used to change the wheel steering angle of the vehicle wheel 10 is then adapted to adjust the track of the vehicle wheel 10 by varying an operating position and/or resting position of the steering adjusting element 24 by means of the steering actuator 28 or by controlling the steering actuator 28. In the present case, the first readjustment region 42 and/or the second readjustment region 44 in particular are used to adjust the utilized adjusting displacement. Consequently, in a first operating state, in particular temporally before the track of the vehicle wheel 10 is adjusted, a first sub-portion of the coupling portion 32 is used, and in a second operating state, in particular temporally after the track of the vehicle wheel 10 has been adjusted, a second sub-portion of the coupling portion 32 which at least partially deviates from and/or is different from the first sub-portion is used to change the wheel steering angle of the vehicle wheel 10.

The operating variable 34 is furthermore determined during a straight-line driving operation of the vehicle 14 and advantageously during an autonomous and/or automated driving operation, for example during a highway drive by way of a highway assist function. By defining a corresponding target trajectory, a particularly precise straight-line drive of the vehicle 14 can be achieved, and a particularly exact determination of the operating variable 34 can thereby be achieved. However, it is also generally conceivable to determine a corresponding operating variable during manual driving operation and/or during defined curve travel, for example when traversing an extended curve. However, in the present case, the operating variable 34 is the motor torque of the steering actuator 28, which is needed to position and/or maintain the, in particular axial, position of the steering adjusting element 24 while the vehicle 14 is traveling in a straight line.

Moreover, in the present case, the operating variable 34 is exemplarily matched with two different reference variables 36, 38, namely a first reference variable 36 in the form of the pre-applied factory setting and a second reference variable 38 in the form of the further operating variable of the further steering actuator 30 that is equivalent to the operating variable 34, whereby plausibility and particularly high operational reliability can be advantageously achieved. In this context, the utilized adjusting displacement is only adjusted if the operating variable 34 shows a corresponding deviation from both reference variables 36, 38. Alternatively, however, a corresponding operating variable could also be matched only with a single reference variable or at least three reference variables.

Moreover, in at least one operating state in which the maximum adjusting displacement is not sufficient to adjust the track of the vehicle wheel 10—that is, in an operating state in which the first readjusting range 42 or the second readjusting range 44 is insufficient or exhausted, a message is generated to indicate to an occupant of the vehicle 14 and/or owner of the vehicle 14 that it is necessary to visit a repair shop to adjust the track of the vehicle wheel 10.

In order to increase an adjustment accuracy in the adjustment of the track of the vehicle wheel 10, it can also be provided to perform an initialization for determining an axial absolute position of the steering adjusting element 24 at a system start, advantageously at each system start, of the vehicle 14 and/or the steering system 54. For this purpose, the wheel steering angle controller 50 or the wheel steering-angle adjusting device 16 can comprise, for example, a detection sensor system 68 with at least one detection sensor 70 that is arranged on the steering mechanism 20, advantageously in the form of an inductive sensor. To detect the axial absolute position of the steering adjusting element 24, the detection sensor 70 can interact with a detection contour 72 of the steering adjusting element 24, for example, in the form of at least one marking, at least one indentation, and/or at least one protrusion. In the present case, for example, the detection sensor 70 provides a detection signal when the detection contour 72 of the steering adjusting element 24 is at the level of the detection sensor 70, which corresponds to the constructive center position of the steering adjusting element 24 in this case. In principle, however, a position other than a center position could also be detected by means of the detection sensor 70. An axial absolute position of the steering adjusting element 24 can then be determined based on the detection signal or the detection signal and at least one control and/or operating variable of the steering actuator 28, such as a rotor position signal. Advantageously, a corresponding initialization is carried out for each of the steering adjusting elements 24, 26 or for each of the wheel steering angle controllers 50, 52. Alternatively, detection sensor technology could naturally also comprise a detection sensor that is designed to sense multiple axial positions of a steering adjusting element. In addition, detection sensor technology could also comprise multiple detection sensors for detecting multiple axial positions of a steering adjusting element.

Figure 3:
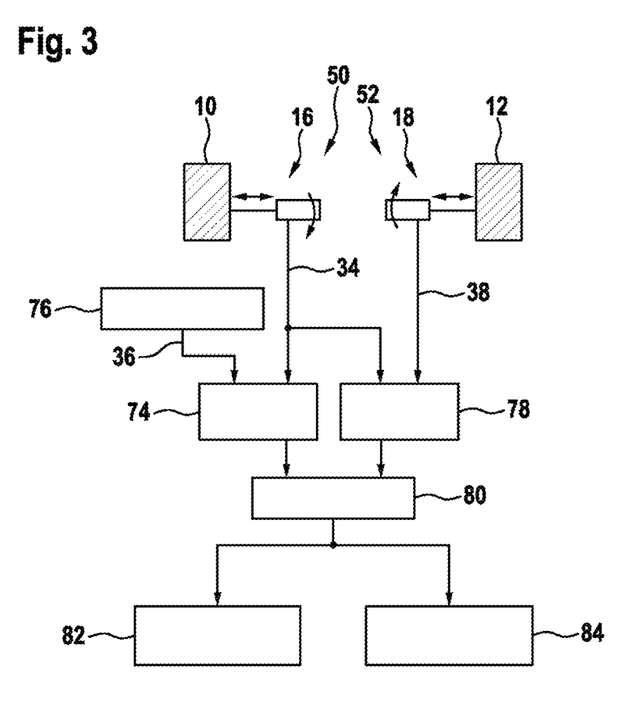

FIG. 3 shows a schematic representation of a simplified, exemplary signal flow diagram for adjusting the track of the vehicle wheel 10 with the wheel steering-angle adjusting device 16.

Herein the operating variable 34 of the steering actuator 28 is determined and provided to a first evaluation routine 74 of the computing unit 48. In addition, the first reference variable 36, which is provided by an operating memory 76 of the vehicle 14 as an example in the present case, is provided to the first evaluation routine 74. The first evaluation routine 74 is provided for this purpose to match the operating variable 34 with the first reference variable 36 in the present case.

Moreover, in the present case, the operating variable 34 of the steering actuator 28 is provided to a second evaluation routine 78 of the computing unit 48. Furthermore, the second reference variable 38, which corresponds to the further operating variable of the further steering actuator 30 in the present case, is determined and supplied to the second evaluation routine 78. In the present case, the second evaluation routine 78 is provided for this purpose to match the operating variable 34 with the second reference variable 38.

Moreover, the first evaluation routine 74 and the second evaluation routine 78 are provided for this purpose to provide a respective result of the adjustment of a third evaluation routine 80 to the computing unit 48.

The third evaluation routine 80 is provided for this purpose to determine whether the operating variable 34 deviates from both reference variables 36, 38. In addition, the third evaluation routine 80 is provided for this purpose to verify whether the maximum adjusting displacement of the coupling portion 32 is sufficient to adjust the track the vehicle wheel 10, or not.

If the maximum adjusting displacement for adjusting the track of the vehicle wheel 10 is sufficient, a readjusting routine 82 of the computing unit 48 is controlled by means of the third evaluation routine 80.

For this purpose, the adjusting routine 82 is provided to adapt an adjusting displacement of the coupling section 32 that is used for changing the wheel steering angle of the vehicle wheel 10 to adjust the track of the vehicle wheel 10, by varying an operating position and/or resting position of the steering actuator 24 by means of the steering actuator 28.

If the maximum adjusting displacement for adjusting the track of the vehicle wheel 10 is not sufficient, a message routine 84 of the computing unit 48 is controlled by means of the third evaluation routine 80.

For this purpose, the message routine 84 is provided to generate a message to notify an occupant of the vehicle 14 and/or an owner of the vehicle 14 that it is necessary to visit a repair shop to adjust the track of the vehicle wheel 10.

In particular, the exemplary signal flow diagram in FIG. 3 is intended to describe, by way of example only, a method for adjusting the track of the vehicle wheel 10 by means of the wheel steering-angle adjusting device 16. In this context, for example, it is conceivable to omit the first reference variable 36 and/or the second reference variable 38. Moreover, further reference variables or other reference variables could be utilized. In addition, the generation of a message could also be omitted in principle.

The invention claimed is:

1. A method for adjusting a track of at least one vehicle wheel of a vehicle using a wheel steering angle adjusting device during operation of the vehicle, wherein the wheel steering angle adjusting device comprises a steering mechanism with a movably mounted steering adjusting element configured to change a wheel steering angle of the vehicle wheel and a steering actuator configured to change a position of the steering adjusting element, wherein the steering adjusting element has a coupling portion for coupling with the steering actuator, which defines a maximum adjusting displacement which is greater than an adjusting displacement required for changing the wheel steering angle of the vehicle wheel, comprising:

determining at least one operating variable of the steering actuator;

comparing the determined at least one operating variable with at least one reference variable;

identifying, based upon the comparison, a difference between the determined at least one operating variable and the at least one reference variable; and adapting, in response to the identification of the difference, an adjusting displacement of the coupling portion that is used for changing the wheel steering angle of the vehicle wheel by varying an operating position and/or resting position of the steering adjustment element using the steering actuator.

2. The method according to claim 1, wherein:
the coupling portion comprises an adjusting range and at least one readjusting range adjacent to the adjusting range;
the adjusting range provides a nominally required adjusting displacement for changing the steering angle of the vehicle wheel; and
the readjusting range provides an additional adjusting displacement as a lead for setting and/or adjusting the track of the vehicle wheel.

3. The method according to claim 2, wherein a ratio between a longitudinal extension and/or an axial length of the adjusting range and a longitudinal extension and/or an axial length of the adjusting range is between 0.01 and 0.05.

4. The method according to claim 1, wherein the at least one operating variable is determined during straight-line driving operation of the vehicle.

5. The method according claim 1, wherein the at least one operating variable is determined during an autonomous and/or automated driving operation.

6. The method according to claim 1, wherein a motor torque of the steering actuator is used as the at least one operating variable.

7. The method according to claim 1, wherein a pre-applied factory setting is used as the at least one reference variable.

8. The method according to claim 1, wherein a further operating variable of a further steering actuator that is equivalent to the at least one operating variable is used as a further reference variable, which is associated with a further vehicle wheel opposite to the vehicle wheel.

9. The method according to claim 1, wherein a drive torque is used as the at least one reference variable.

10. The method according to claim 1, wherein the at least one operating variable is matched to at least two reference variables of the at least one reference variable, and the utilized adjusting displacement is only adjusted when the operating variable deviates from both of the at least two reference variables.

11. The method according to claim 1, wherein, in at least one operating state, in which the maximum adjusting displacement is not sufficient to adjust the track of the vehicle wheel, a message is generated.

12. A control unit with a computing unit configured to carry out the method according to claim 1.

13. A motor vehicle, with at least one vehicle wheel, with a wheel steering angle controller, which has at least one wheel steering-angle adjusting device, which comprises a steering mechanism with a movably supported steering adjusting element for changing a wheel steering angle of the vehicle wheel and a steering actuator for changing a position of the steering adjusting element, and with the control unit according to claim 12.

14. The vehicle according to claim 13, wherein the wheel steering angle controller is designed as a single-wheel adjuster.

* * * * *